United States Patent [19]
Baujat

[11] 4,064,005
[45] Dec. 20, 1977

[54] DEVICE FOR SUPPORTING A NUCLEAR BOILER

[75] Inventor: Jacques Baujat, Versailles, France

[73] Assignee: Commissariat a l'Energie Atomique, Paris, France

[21] Appl. No.: 684,936

[22] Filed: May 10, 1976

[30] Foreign Application Priority Data

May 12, 1975 France .................... 75.14716

[51] Int. Cl.² .................................... G21C 13/02
[52] U.S. Cl. ........................... 176/87; 176/38; 220/69; 248/146
[58] Field of Search ............ 176/38, 87; 52/224, 52/248, 249; 220/9 A, 9 D, 9 LG, 10, 15, 69; 248/14, 146, DIG. 1

[56] References Cited
U.S. PATENT DOCUMENTS

| | | |
|---|---|---|
| 3,716,451 | 2/1973 | Van Sickel .................... 176/60 X |
| 3,775,250 | 11/1973 | Scholz ........................ 248/146 X |
| 3,841,269 | 10/1974 | Urruela ....................... 220/9 LG X |
| 3,853,240 | 12/1974 | Alleaume ..................... 220/9 A X |
| 3,899,988 | 8/1975 | Menendez ..................... 220/14 X |
| 3,901,196 | 8/1975 | Dorner et al. ................. 176/87 X |
| 3,916,944 | 11/1975 | Crawford ..................... 248/146 X |

Primary Examiner—Peter A. Nelson
Attorney, Agent, or Firm—Lane, Aitken, Dunner & Ziems

[57] ABSTRACT

The device comprises a cradle constituted by a plurality of identical and coplanar half-bridges each formed by two identical and parallel main beams. The half-bridges are carried on a vertical supporting element at one extremity which is constituted by one of the extremities of the beams and are rigidly coupled together at the other extremity. The cradle is provided with structural elements which are rigidly fixed to the beams and to which the pressure vessel and steam generators are attached.

15 Claims, 11 Drawing Figures

DEVICE FOR SUPPORTING A NUCLEAR BOILER

This invention relates to a device for supporting a nuclear boiler.

More precisely, the present invention is concerned with a cradle structure which serves to support a nuclear boiler, that is to say the assembly constituted by the pressure vessel proper of the reactor, the steam generators and the primary pumps in such a manner as to ensure that, in the event of external shocks, the effects produced by said shocks on the boiler as a whole are reduced to the maximum extent. The supporting structure is designed in particular to suppress relative effects between the different boiler components, for example the effects which are liable to result from a displacement of a steam generator with respect to the pressure vessel, the consequences of such a displacement in regard to the connecting ducts being readily conceivable.

This problem is particularly acute if the connection between the pressure vessel and the steam generators is short and constituted by pipe sections of substantial thickness since no relative displacement can be permitted in this case without entailing serious risks of duct failures.

The present invention is equally applicable to reactors on land and to marine reactors employed for ship propulsion.

In the case of land-based reactors, the external shocks mentioned earlier can be generated by an earthquake, for example. In the case of ship-borne reactors, external shocks are all those to which the ship may be subjected such as storms, running aground or collisions.

The precise aim of this invention is to provide a supporting device which not only satisfies the conditions set forth in the foregoing but also ensures primary protection and at the same time permits supporting of the containment vessel which is always placed around the boiler in accordance with known practice and serves to collect any possible leakage at the level of the installation.

The device for supporting a nuclear boiler which essentially consists of a pressure vessel and steam generators is distinguished by the fact that it comprises a cradle constituted by a plurality of identical and coplanar half-bridges, each half-bridge being constituted by two identical and parallel main beams, said half-bridges being carried on a vertical supporting element at one extremity which is constituted by one of the extremities of the beams forming said half-bridge and being rigidly coupled together at the other extremity, said cradle being also provided with structural elements which are rigidly fixed to said beam and to which said pressure vessel and said generators are attached.

In accordance with another characteristic feature, the center of gravity of the boiler and of the cradle is located beneath the plane of contact between said cradle and the vertical supporting elements.

In accordance with yet another characteristic feature, the device further comprises a leak-tight containment vessel which surrounds said cradle and said boiler and is rigidly fixed to said cradle.

Preferably, said cradle also supports the biological shield elements which surround said generators and said pressure vessel.

In one particular form of construction, the cradle is constituted by two main beams representing two half-bridges in the line of extension of each other; the extremities of each beam rest on a support which is integral with the internal face of the containment vessel; said containment vessel is provided on the external face thereof with external supports which rest on the vertical supporting elements and said external supports rest on said vertical elements with or without interposition of damping devices.

A better understanding of the invention will in any case be obtained from the following description of a number of embodiments of the invention which are given by way of example and not in any sense by way of limitation, reference being made to the accompanying drawings, wherein.

Figure 1:
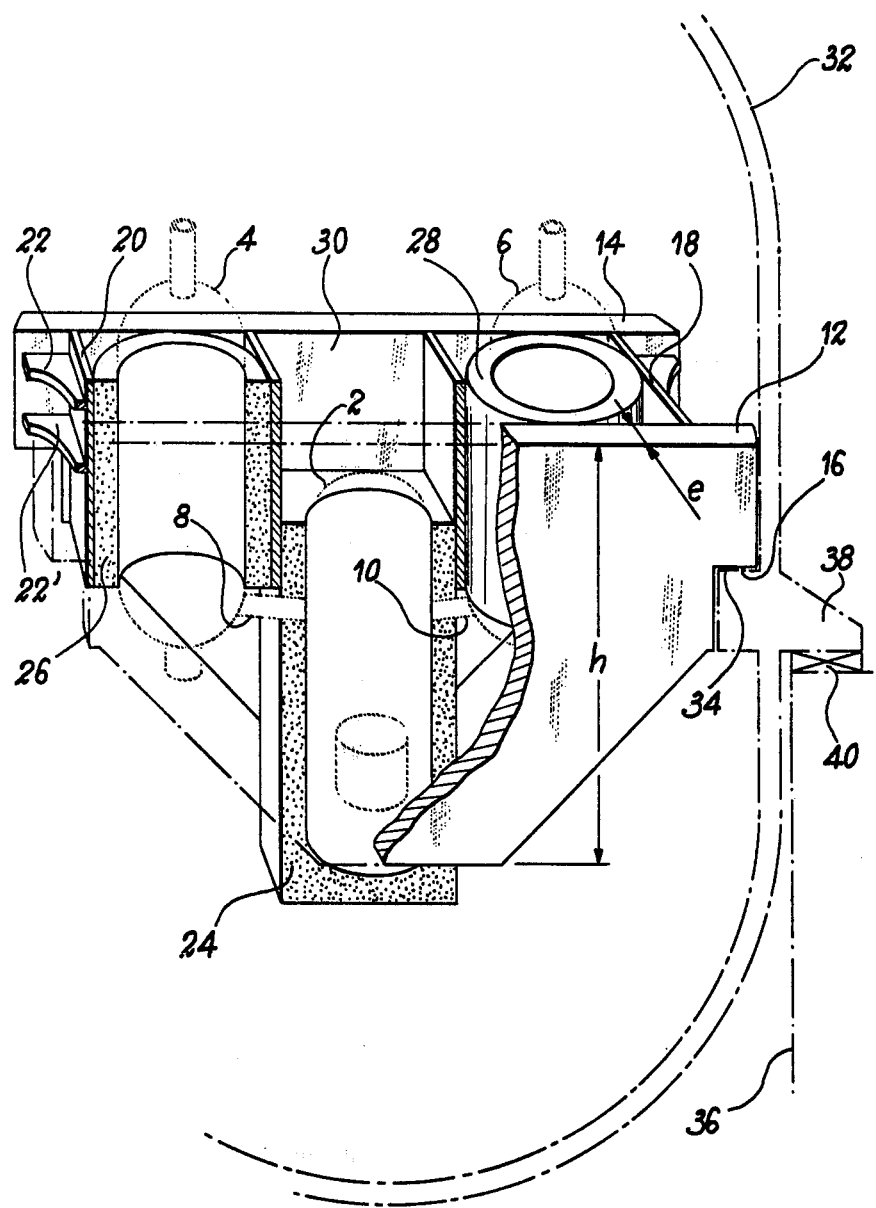
FIG. 1 is a perspective view of the device when the boiler comprises only two steam generators.

The view of FIG. 1 illustrates a simplified form of construction of the device in the case in which the nuclear boiler comprises a pressure vessel and two steam generators.

In order to increase the clarity of the figure, the pressure vessel 2, the steam generators 4 and 6 as well as the ducts 8 and 10 for connecting said pressure vessel to said steam generator have been shown only in dotted lines.

The device for supporting this assembly is essentially made up of a cradle constituted by two main beams 12 and 14 which are parallel to each other and form a kind of bridge.

The extremity of each beam rests on a support structure. For example, the extremity 16 of the beam 12 rests on the right-hand support structure which will be described hereinafter.

The entire installation is suspended from or supported by the two beams 12 and 14 aforementioned. The beams 12 and 14 are associated with a general metal framework which is attached to said beams. Said framework has simply been sketched in broad outline in the figure. There can be seen, for example, the cross-plates 18 and 20 which are endowed with rigidity by the angle brackets 22, 22'. It is of course apparent that, in actual practice, a very large number of elements are provided for these metallic structural assemblies.

The cradle which is constituted by the beams 12 and 14 supports not only the pressure vessel 2 and the steam generators 4 and 6 but also the biological shield elements.

There is thus shown the element 24 which surrounds the side wall and bottom end of the pressure vessel 2 and the elements 26 and 28 which surround the steam generators 4 and 6.

The cradle can also comprise ancillary structures such as the structure 30 which performs the function of a pool and is placed above the pressure vessel 2.

The device also comprises a leak-tight containment vessel 32 which surrounds the entire cradle and the nuclear boiler. In a first simplified form of construction, the extremities of the beams 12 and 14 rest on support ledges such as for example the ledge 34 which are formed on the internal face of the containment vessel 32. An identical support is clearly provided for each extremity of the beams 12 and 14.

The containment vessel 32 in turn rests on supporting walls 36 by means of external supports 38 which are integral with the containment vessel. The support 38 is preferably carried on the wall 36 by means of damping devices 40 which will be described hereinafter but are not necessary in all the modes of application. The main elements of the boiler and of the biological shield occupy with respect to the level of the beams 12 and 14 a position such that the center of gravity of the supported assembly is located beneath the supporting plane.

In fact, this arrangement is very favorable for guarding against the effects of shocks caused either by the ship or by an earthquake.

Figure 2:
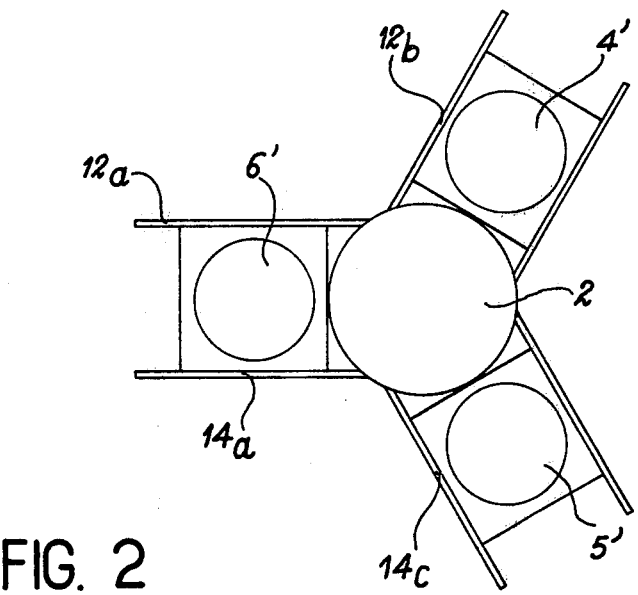
FIGS. 2 and 3 are examples of construction of the cradle in the case of three and four steam generators.

The simplified view of FIG. 2 shows one example of construction of a cradle in the case in which the boiler comprises three steam generators designated respectively by the references 4', 5' and 6'. In this case, the cradle proper is constituted by an assembly of three half-bridges each designed to support one of the steam generators and also to support the pressure vessel.

The three half-bridges aforesaid are spaced at angular intervals of 120° and rigidly connected to each other at one end whilst the other end rests in each case on a support structure.

For example, the generator 6' rests directly on the half-bridge which is constituted by the beams 12a and 14a. The free extremity of each beam 12a and 14a rests on a support structure whilst said beams are rigidly fixed at the other end to the extremities of the beams 12b and 14c which constitute half-bridges associated with the steam generators 4' and 5'.

Figure 3:
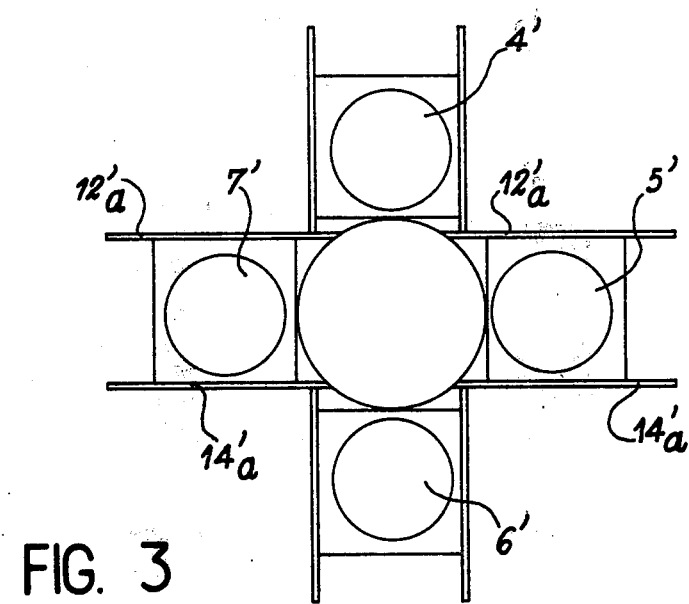

FIG. 3 illustrates a simplified form of construction in which the nuclear boiler comprises four steam generators designated respectively by the references 4', 5', 6' and 7'. There will in this case be the equivalent of four half-bridges each constituted by two main beams, one end of which rests on the support structures. Provision is preferably made in this case for two main beams constituting two half-bridges such as the beams 12'a and 14'a, for example, which serve directly to support steam generators 5' and 7' and two half-bridges corresponding to the steam generators 4' and 6', the beams constituting these latter being attached to the beams 12'a and 14'a. In this case also, the complete installation is supported by the extremities of the four half-bridges.

It is readily apparent that the main beams such as the beams 12 and 14, for example, must have very high mechanical strength, taking into account on the one hand the weight of the installation and on the other hand the overall size of said installation which entails the need for beams of substantial length. Said beams can be constructed either in a single piece or by assembling together a number of beam elements by riveting, welding or bolting. As a result of the stresses applied to the beams 12 and 14, these latter necessarily have a certain moment of inertia.

Taking this moment of inertia into account, steps will be taken to give the highest possible value to the height $h$ of the beam by reducing the thickness $e$ of this latter. In fact, a relatively high value of $h$ makes it possible by means of the cradle to constitute an anti-missile shield between the boiler unit and the containment vessel 32.

Figure 4:
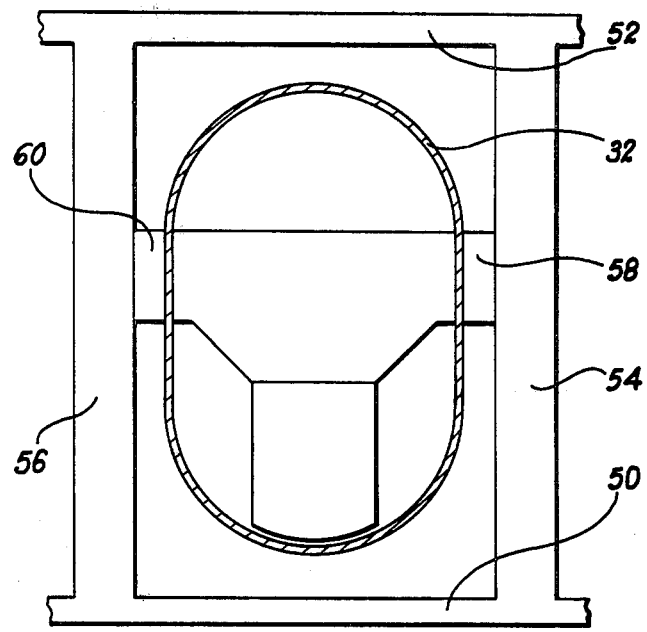
FIGS. 4 and 5 show one example of application to the case of ship-borne boilers.
Figure 5:
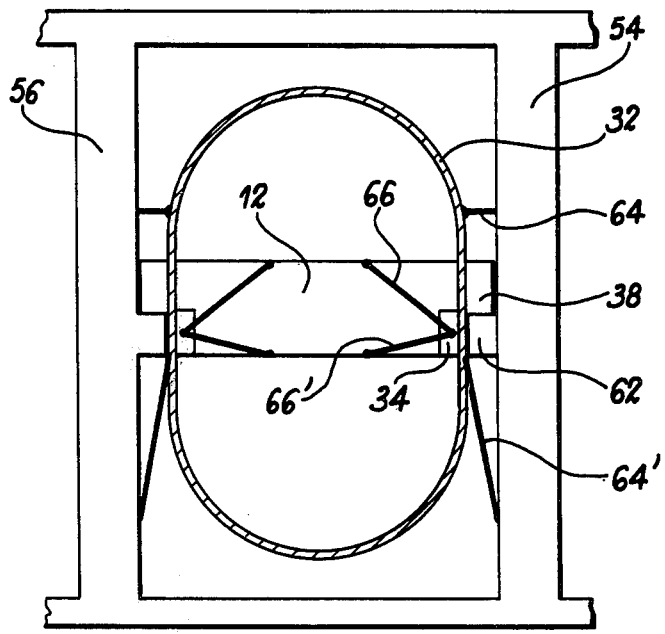

FIGS. 4 and 5 illustrate diagrammatically one mode of adaptation of the supporting device to the case of a ship-borne reactor. The figures show the bottom 50 and the deck 52 of the ship. The cradle is supported by means of two vertical partition-walls 54 and 56, said two partition-walls being perpendicular to the axis of the ship, with the result that the beams constituting the cradle are parallel to said axis. By way of example, the partition-walls 54 and 56 are welded to the bottom 50 and the deck 52. If the front and rear partition-walls 54 and 56 have a sufficient degree of flexibility, it is possible to weld the containment vessel 32 to the partition-walls 54 and 56, for example by means of the members 58 and 60. The supports 34 and 38 are thus dispensed with.

When the partition-walls 54 and 56 do not have a sufficient degree of flexibility, it is necessary to adopt the solution illustrated in FIG. 5 which is very closely related to the solution illustrated in FIG. 1. In this case, there are again shown the supports 34 and 38, the support 38 being intended to rest on a bearing member 62 which is integral with the partition-wall 54. The same arrangement would clearly be provided at the other end of the beam 12.

In order to endow the complete assembly with structural rigidity, provision can be made for tie-rods such as 64 and 64' which ensure a mechanical connection between the wall 54 and the containment vessel 32 and for tie-rods such as 66 and 66' which ensure a mechanical connection between the containment vessel 32 and the beam 12. By way of example, said tie-rods are secured at one end to the beam 12 and at the other end to the support 34. It is readily apparent that the same arrangements would be made in the case of the beam 14.

It is possible in addition to complete the protection of the containment vessel 32 which has already been partially ensured by the vertical partition-walls 54 and 56, by means of an anti-collision shield (not shown) which comprises two vertical partition-walls located at right angles to the partition-walls 54 and 56 and a roof.

Figure 6A:
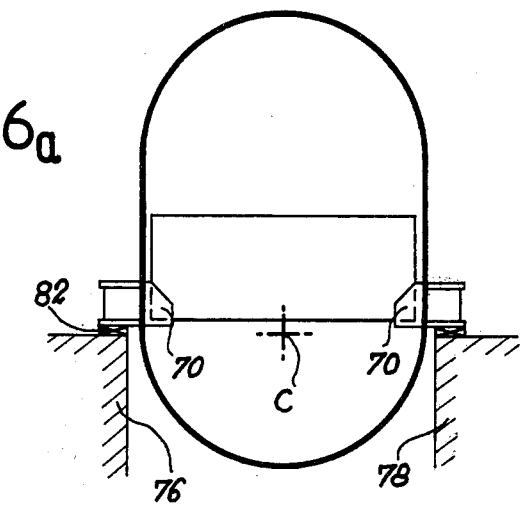
FIGS. 6a, 6b and 6c show one example of application to the case of land-based boilers.
Figure 6B:
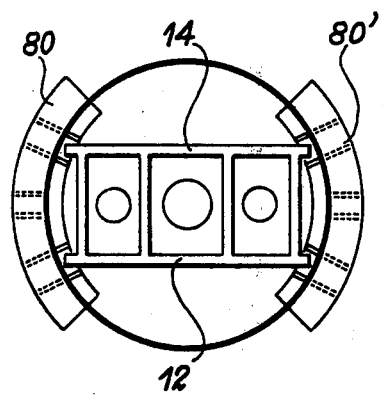
Figure 6C:
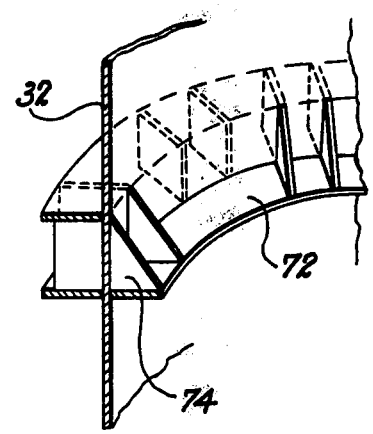

FIGS. 6a, 6b and 6c illustrate a mode of adaptation of the supporting device to the case of a land-based installation. In this case, each extremity of the beams 12 and 14 rests on a support bracket 70. In the case of the figure, the extremities of the beams 12 and 14 will accordingly rest on four support brackets 70 which are rigidly fixed to the containment vessel 32. By way of example, said support brackets can be constituted by a horizontal annular flange 72 which is welded to the internal wall of the containment vessel and reinforced at the level of the bearing points of the beam extremities by means of triangular gusset-plates such as 74. The connection between the cradle and the containment vessel has thus been described. The containment vessel is in turn supported on two concrete blocks 76 and 78 by means of two partitioned circular beams 80 and 80' which are welded to the external face of the containment vessel and are carried on the bearing faces of the concrete blocks 76 and 78 by means of resilient damping devices 82 which will be described hereinafter. In this case the center of gravity C of the complete installation within the interior of the containment vessel is preferably located at a level below the point of application of the beams 80 on the concrete blocks 76 and 78.

Figure 7:
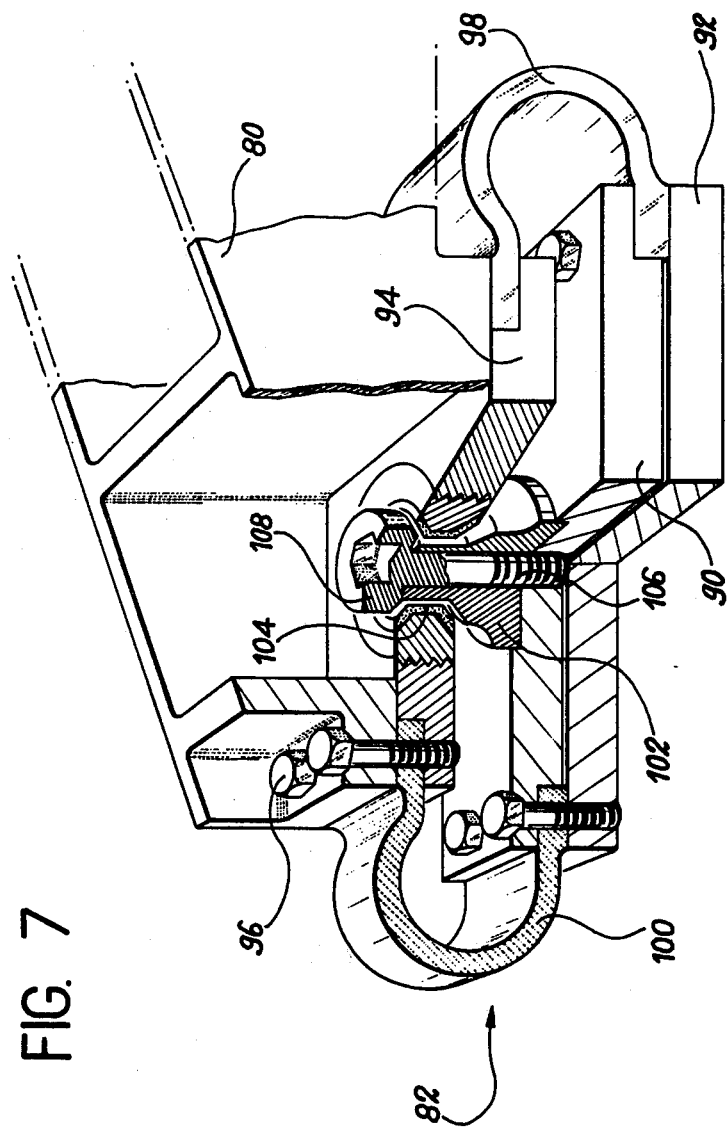
FIG. 7 is a perspective view of one form of construction of the damping devices.

FIG. 7 is a view in perspective which is partially broken away and shows one form of construction of the damping device 82. This device essentially comprises two plates, namely a lower plate 90 fixed on a base plate 92 which is anchored in the concrete block and an upper plate 94 which is rigidly fixed to the circular beam 80, for example by means of screws such as the screw 96. The plates 90 and 94 are connected to each other by means of two elastic members designated respectively by the references 98 and 100 and having a cross-section in the shape of a capital omega. The elastic members are formed of material which has a high value of resilience.

Thus the device absorbs the energy of the shock by plastic deformation and damps the transmission of the shock by means of a low natural frequency.

Any possible displacements of the plates 90 and 94 under the action of an earthquake are limited and guided by the member 102 which is capable of sliding within the bore 104 formed within the plate 94. The member 102 is fixed on the plate 90 by means of a screw 106, the head 108 of which serves as a stop for any possible displacements of the upper plate 94.

Figure 8:
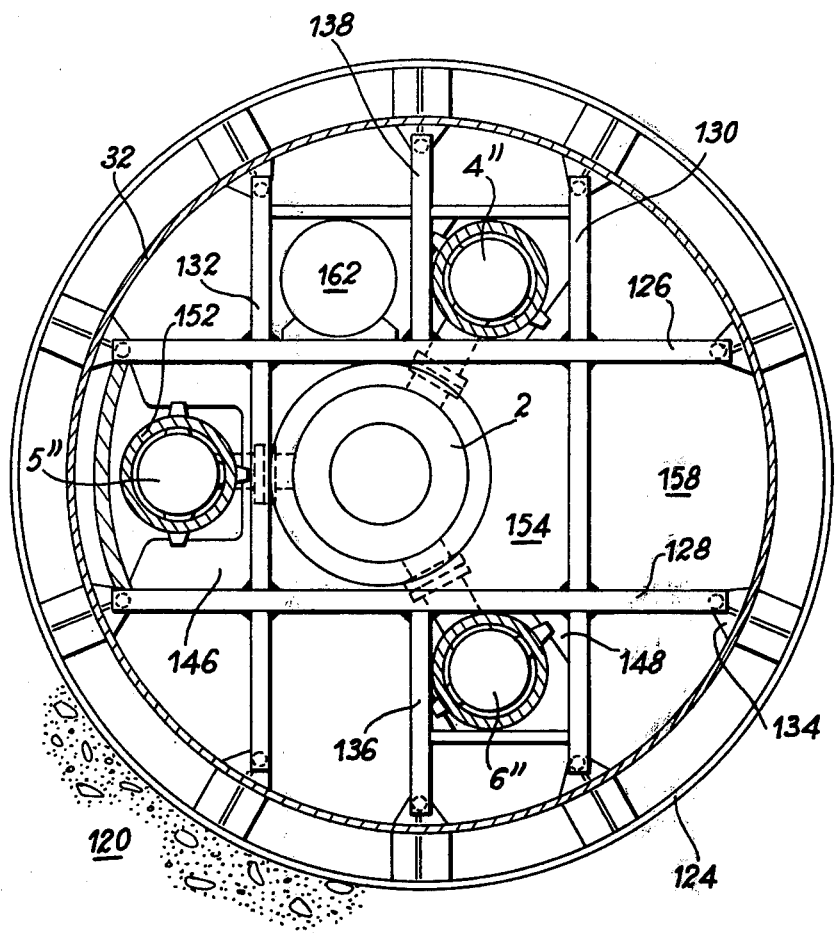
FIGS. 8 and 9 are respectively a top view and a vertical part-sectional view of one form of construction of the cradle with four half-bridges.
Figure 9:
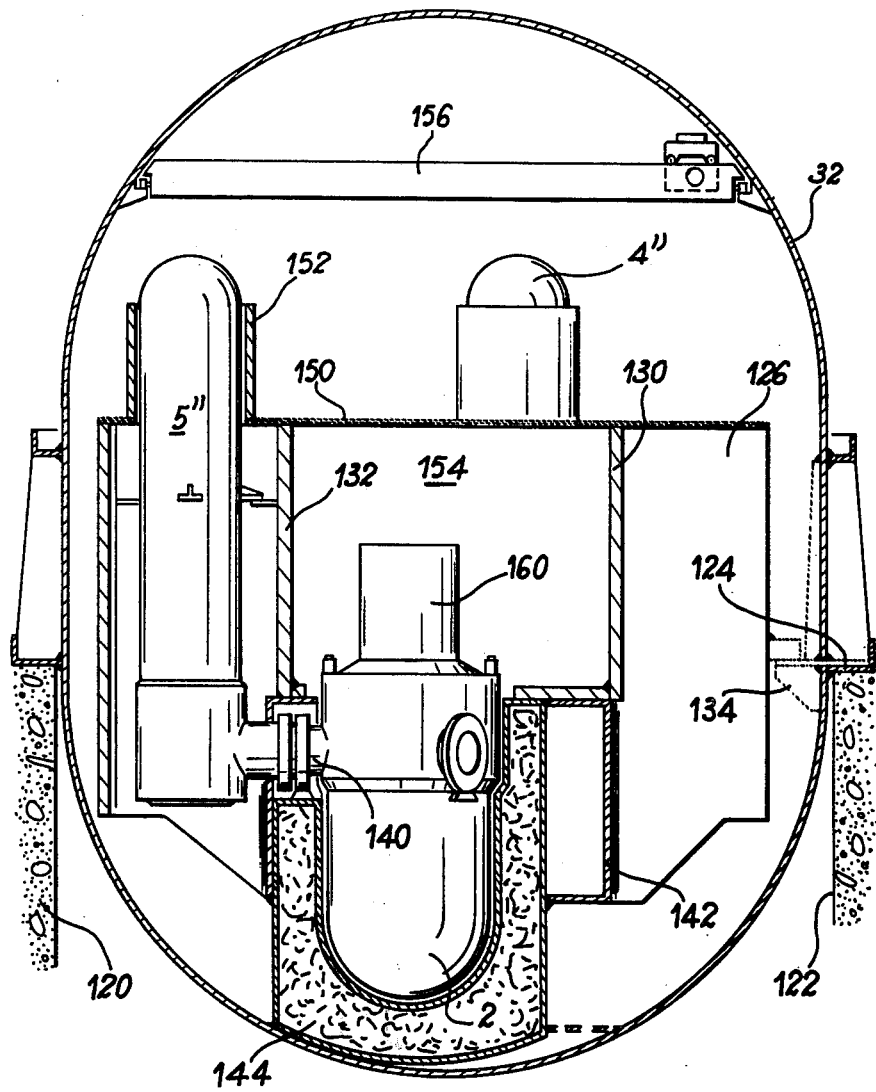

In FIGS. 8 and 9, there is shown a more detailed form of construction of a supporting device corresponding to the case in which the nuclear installation comprises a pressure vessel 2 and three steam generators 4", 5" and 6". This form of construction nevertheless comprises four half-bridges arranged in pairs in the line of extension of each other. This form of construction therefore corresponds to the case of FIG. 3. The installation as a whole rests on a concrete block 120 having a central cylindrical opening 122 in which the installation is partially placed. The device comprises a containment vessel 32 constituted for example by a cylindrical shell having a diameter of 16m, a height of 6.6m and closed by half-spheres, the complete assembly being of steel construction. The containment vessel 32 is supported on the concrete block 120 by an outer ring 124 which is rigidly fixed to the external wall of the vessel.

The cradle proper is constituted by four main beams 126, 128, 130 and 132 which constitute a supporting cross. The beams are joined to each other by welding, for example, and are carried at the free extremities thereof by supports 134 formed on the internal wall of the containment vessel 32. In this form of construction, the cradle is completed by two half-beams 136 and 138 which are parallel to the beams 130 and 132 and also rest on internal supports 134.

The pressure vessel 2 is supported by means of its three coupling flanges 140 which provide a connection with the steam generators. Said flanges rest on a horizontal plate 142 which is welded to the four main beams at the location in which the beams themselves constitute a square structure. The pressure vessel is surrounded by a biological shield 144 which is suspended from the square structure. Supporting of the steam generators is of course also carried out by means of the main beams. In the case of the generator 5", the supporting function is performed by means of a recessed sheet metal member. Similarly in the case of the generators 4" and 6", the supporting function is performed by the beam 130 and by the half-beams 136 and 138 and by plates such as 148 which are rigidly fixed to said beams. The steam generators are surrounded by a screen constituted by the beams. Above the top level 150 of the beams, the generators are surrounded by a biological shield 152. The space 154 which is limited by the four main beams and closed at the bottom by the plate 142 constitutes a pool for loading and unloading operations in the reactor core. These operations are carried out partly by means of the traveling bridge crane 156 which is placed within the interior of the containment vessel 32. The zone 158 in which no steam generator is present and which is provided with a floor serves to store the closure head 160 of the reactor vessel at the time of refuelling operations.

It is known that a nuclear installation comprises a certain number of ancillary components. As shown in FIG. 9, such components include the pressurizer 162 which is also fixed on the main beams.

The supporting method which is described in this patent application and can be distinguished by the fact that provision is made for a suspended cradle which supports all the primary circuit units of the reactor such as pressure vessel, steam generator, pressurizer and so forth offers a large number of advantages:

it permits the possibility of freeing the bottom of the containment vessel, which is very useful for improving the access to the primary pumps and for inspecting the exterior of the pressure vessel, the weights to be supported are transmitted to the structures of a ship or to the foundations of a power station above the center of gravity of said weights, thus making it possible to interpose shock-absorbing devices for guarding against earthquakes or violent external forces.

Moreover, the special shape which can be given to the beam constituting the cradle makes it possible to set up primary anti-missile protection.

By virtue of the feature which has just been mentioned, the secondary biological shield can also be incorporated around the steam generator, and elements for supporting units such as water-boxes, handling ponds and the like can be incorporated in the beams and structural framework.

Although the detailed description given above is essentially concerned with the case of a cradle consisting of two half-bridges, it remains apparent that the arrangements described in the foregoing can very easily be applied to the case of FIGS. 2 and 3. In other words, instead of having two sets of two supports 34 and 38, provision will be made for three or four. Similarly, in the alternative embodiment shown in FIGS. 6a, 6b and 6c, there will be six or eight support brackets 74 and three or four partitioned beams 80.

What we claim is:

1. A device for supporting a complete nuclear boiler including at least a pressure vessel and one steam generator, wherein said device comprises: a cradle constituted by a plurality of identical half-bridges, the upper surfaces of said half-bridges being coplanar, each half-bridge being constituted by two identical and parallel main beams, each of said half-bridges being carried on a vertical supporting element at one extremity which is constituted by one of the extremities of the beams forming said half-bridge and being rigidly coupled together at the other extremity; and a plurality of structural elements which are rigidly fixed to said beams and are attached to said pressure vessel and said generator to support and suspend said pressure vessel and said generator.

2. A device according to claim 1, wherein the center of gravity of the boiler and of the cradle is located beneath the plane of contact between said cradle and the vertical supporting elements.

3. A device according to claim 2, wherein said device further comprises a leak-tight containment vessel which surrounds said cradle and said boiler and is rigidly fixed to said cradle.

4. A device according to claim 2 wherein said cradle also supports biological shield elements which surround said generators and said pressure vessel.

5. A device according to claim 2, wherein the first extremities of said half-bridges rest on a support which is integral with the internal face of said containment vessel and wherein the external face of said containment vessel is provided with supports which rest on vertical supporting elements.

6. A device according to claim 3, wherein the first extremities of said half-bridges are welded to said containment vessel and wherein said containment vessel is welded to the vertical supporting elements.

7. A device according to claim 3, wherein the cradle is constituted by two main beams representing two half-bridges located in the line of extension of each other, wherein the extremities of each beam rest on a support which is integral with the internal face of the containment vessel and wherein said containment vessel is provided on the external face thereof with external supports which rest on the vertical supporting elements.

8. A device according to claim 7, wherein said external supports are carried on said vertical elements by means of damping devices.

9. A device according to claim 8, wherein said vertical elements are constituted by two concrete blocks and wherein the external supports are constituted by two portions of beams having one flange rigidly fixed to the external face of said containment vessel and supported on said concrete blocks by means of damping devices.

10. A device according to claim 7, wherein the extremities of said beams are welded to said containment vessel, wherein said supporting elements are constituted by two metallic partition-walls which are parallel to each other and wherein said containment vessel is attached to said partition-walls by means of metallic members.

11. A device according to claim 2, wherein the cradle is formed by four main beams so as to constitute four half-bridges disposed along the arms of a cross, the central portion of the cradle surrounded by the four beams being provided with a horizontal plate from which the pressure vessel is suspended by means of the coupling flanges of said pressure vessel.

12. A device according to claim 11, wherein said device further comprising a leak-tight containment vessel which surrounds said cradle and said boiler and is rigidly fixed to said cradle.

13. A device according to claim 12, wherein the first extremities of said half-bridges rest on a support which is integral with the internal face of said containment vessel and wherein the external face of said containment vessel is provided with supports which rest on vertical supporting elements.

14. A device according to claim 12, wherein the cradle is constituted by two main beams representing two half-bridges located in the line of extension of each other, wherein the extremities of each beam rest on a support which is integral with the internal face of the containment vessel and wherein said containment vessel is provided on the external face thereof with external supports which rest on the vertical supporting elements.

15. A device according to claim 14, wherein said external supports are carried on said vertical elements by means of damping devices.

* * * * *